US012700054B2

(12) United States Patent
Rezaei et al.

(10) Patent No.: US 12,700,054 B2
(45) Date of Patent: Aug. 4, 2026

(54) METHODS AND SYSTEMS FOR LATENT-AWARE IMAGE WATERMARKING

(71) Applicants: Ahmad Rezaei, Burnaby (CA); Mohammad Akbari, Coquitlam (CA); Xin Jin, Beijing (CN); Yi Xie, Shenzhen (CN); Yong Zhang, Richmond (CA)

(72) Inventors: Ahmad Rezaei, Burnaby (CA); Mohammad Akbari, Coquitlam (CA); Xin Jin, Beijing (CN); Yi Xie, Shenzhen (CN); Yong Zhang, Richmond (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 278 days.

(21) Appl. No.: 18/653,348

(22) Filed: May 2, 2024

(65) Prior Publication Data

US 2025/0342553 A1 Nov. 6, 2025

(51) Int. Cl.
*G06T 1/00* (2006.01)
*G06F 21/10* (2013.01)
(Continued)

(52) U.S. Cl.
CPC ............ *G06T 1/0021* (2013.01); *G06F 21/10* (2013.01); *G06N 3/045* (2023.01); *G06N 3/0475* (2023.01);
(Continued)

(58) Field of Classification Search
CPC ....... G06T 1/0021; G06T 3/4053; G06T 5/77; G06T 9/00; G06T 1/0028; G06N 3/045;
(Continued)

(56) References Cited

U.S. PATENT DOCUMENTS 8,923,548 B2 * 12/2014 Petrovic ............... G06V 30/242
382/100
2022/0092721 A1 3/2022 He et al.
(Continued)

FOREIGN PATENT DOCUMENTS

CN 115809953 A 3/2023
CN 117057969 A 11/2023

OTHER PUBLICATIONS

J. Huang, et al., "ARWGAN: Attention-Guided Robust Image Watermarking Model Based on GAN," IEEE Transactions on Instrumentation and Measurement, vol. 72, pp. 1-17, 2023.
(Continued)

*Primary Examiner* — Khai M Nguyen

(57) ABSTRACT

Methods, devices, and processor-readable media for digital image watermarking, including performing one or more decoding operations that each include generating a respective intermediate watermark embedding feature tensor that includes one or more representations of a watermark message embedded into a feature tensor generated by a preceding decoding operation; upscaling the respective intermediate watermark embedding feature tensor to generate a further feature tensor; and generate a watermarked image based on the further feature tensor.

20 Claims, 11 Drawing Sheets

(51) Int. Cl.

| | |
|---|---|
| *G06N 3/045* | (2023.01) |
| *G06N 3/0475* | (2023.01) |
| *G06N 3/08* | (2023.01) |
| *G06N 3/088* | (2023.01) |
| *G06T 3/4053* | (2024.01) |
| *G06T 5/77* | (2024.01) |
| *G06T 9/00* | (2006.01) |

(52) U.S. Cl.
CPC ............... *G06N 3/08* (2013.01); *G06N 3/088* (2013.01); *G06T 1/0028* (2013.01); *G06T 3/4053* (2013.01); *G06T 5/77* (2024.01); *G06T 9/00* (2013.01)

(58) Field of Classification Search
CPC ........ G06N 3/0475; G06N 3/08; G06N 3/088; G06F 21/10
See application file for complete search history.

(56) References Cited

U.S. PATENT DOCUMENTS

| | | | |
|---|---|---|---|
| 2023/0111326 A1 | 4/2023 | Zahn et al. | |
| 2023/0325961 A1 | 10/2023 | He et al. | |
| 2023/0362399 A1* | 11/2023 | Luo ........................ | H04N 19/44 |
| 2024/0135482 A1 | 4/2024 | Wang et al. | |

OTHER PUBLICATIONS

R. Corvi, et al., "On The Detection of Synthetic Images Generated by Diffusion Models," ICASSP 2023—2023 IEEE International Conference on Acoustics, Speech and Signal Processing (ICASSP), Rhodes Island, Greece, 2023, pp. 1-5.

D. C. Epstein, et al., "Online Detection of AI-Generated Images," 2023 IEEE/CVF International Conference on Computer Vision Workshops (ICCVW), Paris, France, 2023, pp. 382-392.

V. Kishore, et al., "Fixed Neural Network Steganography: Train the images, not the network", International Conference on Learning Representations, Jan. 28, 2023, pp. 1-22.

X. Luo et al., "Distortion Agnostic Deep Watermarking", Proceedings of the IEEE/CVF Conference on Computer Vision and Pattern Recognition (CVPR), 2020, pp. 13548-13557.

T. Bui et al., "RoSteALS: Robust Steganography Using Autoencoder Latent Space", Proceedings of the IEEE/CVF Conference on Computer Vision and Pattern Recognition (CVPR) Workshops, 2023, pp. 933-942.

Z. Sha et al., "DE-FAKE: Detection and Attribution of Fake Images Generated by Text-to-Image Generation Models", CCS '23: Proceedings of the 2023 ACM SIGSAC Conference on Computer and Communications Security, pp. 3418-3432.

P. Fernandez et al., "Watermarking Images in Self-Supervised Latent Spaces," ICASSP 2022—2022 IEEE International Conference on Acoustics, Speech and Signal Processing (ICASSP), Singapore, Singapore, 2022, pp. 3054-3058.

Q. Nguyen et al., "Stable Messenger: Steganography for Message-Concealed Image Generation", arXiv:2312.01284, 2023.

P. Fernandez et al., "The Stable Signature: Rooting Watermarks in Latent Diffusion Models", Proceedings of the IEEE/CVF International Conference on Computer Vision (ICCV), 2023, pp. 22466-22477.

M. Tancik et al., "StegaStamp: Invisible Hyperlinks in Physical Photographs", Proceedings of the IEEE/CVF Conference on Computer Vision and Pattern Recognition (CVPR), 2020, pp. 2117-2126.

Y. Wen et al., "Tree-Ring Watermarks: Fingerprints for Diffusion Images that are Invisible and Robust", arXiv:2305.20030, 2023.

C. Xiong et al., "Flexible and SecureWatermarking for Latent Diffusion Model", MM '23: Proceedings of the 31st ACM International Conference on Multimedia, Oct. 27, 2023, pp. 1668-167.

* cited by examiner

400

Generate a first watermark embedding feature tensor that includes one or more representations of a watermark message embedded into the latent feature tensor, and upscaling the first watermark embedding feature tensor to generate a respective upscaled watermark embedding feature tensor
$204_0$

Generate a respective intermediate watermark embedding feature tensor that includes one or more representations of the watermark message embedded into the upscaled watermark embedding feature tensor generated by a preceding decoding operation of the set of decoding operations, and upscaling the respective intermediate watermark embedding feature tensor to generate a further upscaled watermark embedding feature tensor
$204_{1\ to\ N-2}$

Generate a final watermark embedding feature tensor that includes one or more representations of the watermark message embedded into the upscaled watermark embedding feature tensor generated by the final intermediate decoding operation, and upscaling the respective final watermark embedding feature tensor to generate the watermarked image.
$204_{N-1}$

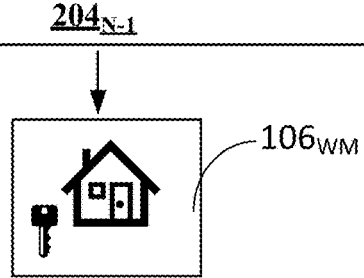

METHODS AND SYSTEMS FOR LATENT-AWARE IMAGE WATERMARKING

RELATED APPLICATION DATA

This is the first-filed application for this disclosure.

FIELD

The present application generally relates to image water-marking, and more particularly, to methods and systems for generating and detecting watermarked images and obtaining models for generating and detecting such images.

BACKGROUND

With rapid advancements in generative models, AI-generated content (AIGC) in different modalities (including images, video, text, and 3D renderings) can be generated using text and/or image prompts. Specifically, for image generation, several text-to-image services are open to public and have shown stunning performance in generation of photo-realistic images. Such performance has reduced the barriers to creating synthetic images that are indistinguish-able from real ones. However, such tools can be misused in different ways such as faking AI-generated images as human-created artworks, generating fake news, imperson-ation, and copyright infringement. Such threats raise con-cerns about confidence and trust in the authenticity of photorealistic images. Thus, responsible implementation of generative AI services needs to be considered by model developers. To this end, two problems, namely detection and attribution, should be addressed. Detection concerns the ability to detect if an image is produced by a specific generative model, which is then evidence that the image is AI-generated and not real. Attribution concerns the ability to confirm the exact identity of a generative model that gen-erated an image, which in turn can be mapped to a specific user.

Developers of generative AI models spend tremendous resources and time to train generative models that can produce high-quality outputs. This development process is and typically beyond the ability of most parties. Thus, there is great demand for accessing pre-trained generative models, creating opportunities for model owners to sell their models. This introduces the risk of illegal access/distribution of the purchased models by adverse parties. Thus, model develop-ers are interested to protect the intellectual property of the model. In this scenario, model owner should be able to verify if their model has been used to generate content.

One solution to deal with above-mentioned problems is imperceptible image watermarking. This involves hiding a secret message inside the image, which can later be extracted and used for both AIGC detection/attribution and model ownership verification. For AIGC images, existing watermarking methods include post-generation processes that are applied after an image is generated (also referred to as "post-generation" watermarking, as opposed to "in-gen-eration" watermarking). However, such post-generation techniques introduce an overhead on the generation service due to the extra post-processing step. Moreover, the water-marking and generation processes are de-coupled from each-other, which results in a trade-off between water-marked image quality and watermark extraction accuracy. In contrast, an in-generation image watermarking method inte-grates the watermarking into the generation process of the generative model. Thus, all the generated images already conceal traceable unique watermarks. Furthermore, because watermark addition is part of the generative model, added watermarks can also be used for model ownership verifica-tion.

An imperceptible watermarking method is required to balance three aspects: 1. Robustness, 2. Imperceptibility/Utility, and 3. Capacity. Regarding robustness, a watermark-ing method should be able to extract the watermark message from the watermarked image even if it is modified by various image transformations (or attacks) ranging from innocuous (e.g., format compression), geometric (e.g., crop-ping), noise (e.g., shot-noise), social media (e.g., emoji overlay), etc. Regarding Imperceptibility/Utility, water-marking should not add any visible artifacts to the original image. Regarding capacity: a watermarking processes has a certain capacity, meaning that it can embed watermarks with a certain length/size into the image without damaging the utility of the image.

An intrinsic characteristic of imperceptible watermarking is the natural trade-off between these three aspects. The imperceptibility requirement of the watermarking limits the capacity of the information that can be embedded into the data. Therefore, when the embedded message gets longer, watermarking a longer message would distort the content of the data, increase the errors in the extracted messages, and reduce the robustness of watermark against possible attacks. The capacity of the watermarking method depends on the data type. Datatypes that have higher redundancies, have more room for embedding longer messages. As a result, a message's length to be considered long varies by the data type and the target application.

Accordingly, there is a need for methods and systems that can effectively achieve and suitably balance the above-noted aspects.

SUMMARY

According to a first example aspect, a computer-imple-mented method of digital image watermarking is disclosed that includes performing a set of decoding operations to generate a watermarked image corresponding to a first latent feature tensor. The set of decoding operations include a first decoding operation, one or more intermediate decoding operations, and a final decoding operation. The first decod-ing operation includes: generating a first watermark embed-ding feature tensor that includes one or more representations of a watermark message embedded into the first latent feature tensor, and upscaling the first watermark embedding feature tensor to generate a respective upscaled feature tensor. The one or more intermediate decoding operations each include: generating a respective intermediate water-mark embedding feature tensor that includes one or more representations of the watermark message embedded into the upscaled feature tensor generated by a preceding decod-ing operation of the set of decoding operations, and upscal-ing the respective intermediate watermark embedding fea-ture tensor to generate a further upscaled feature tensor. The final decoding operation includes generating a final water-mark embedding feature tensor that includes one or more representations of the watermark message embedded into the upscaled feature tensor generated by a final intermediate decoding operation, and upscaling the respective final water-mark embedding feature tensor to generate the watermarked image.

In at least some example implementations of the first example aspect, each upscaling is performed by a respective layer of a multi-layer decoder model that is configured by a set of machine-learned parameters.

In at least some example implementations of the preceding examples, generating the first watermark embedding feature tensor includes generating a first perturbation tensor that includes multiple perturbed representations of the watermark message combined with the first latent feature tensor, and combining the first perturbation tensor and the first latent feature tensor to form the first watermark embedding feature tensor. For each intermediate decoding operation, generating the respective intermediate watermark embedding feature tensor includes: generating a respective perturbation tensor that includes multiple perturbed representations of the watermark message combined with the upscaled feature tensor generated by the preceding decoding operation, and combining the respective perturbation tensor and the upscaled feature tensor generated by the preceding decoding operation to form the respective intermediate watermark embedding feature tensor. Furthermore, generating the final watermark embedding feature tensor includes generating a final perturbation tensor that includes multiple perturbed representations of the watermark message combined with the upscaled feature tensor generated by the final intermediate decoding operation, and combining the final perturbation tensor and the upscaled feature tensor generated by the final intermediate decoding operation to form the final watermark embedding feature tensor.

In at least some example implementations of the preceding examples, generating the first perturbation tensor includes combining repeated first representations of the watermark message to form a first watermark tensor having the same dimensions as the first latent feature tensor, concatenating the first watermark tensor and the first latent feature tensor to form a first concatenated tensor, and performing a first convolution operation on the first concatenated tensor to generate the first perturbation tensor, the first convolution operation being configured by a set of machine-learned first convolution operation parameters. For each intermediate decoding operation, generating the respective perturbation tensor includes combining repeated respective representations of the watermark message to form a respective watermark tensor having the same dimensions as the upscaled feature tensor generated by the preceding decoding operation, concatenating the respective watermark tensor and the upscaled feature tensor generated by the preceding decoding operation to form a respective concatenated tensor, and performing a respective convolution operation on the respective concatenated tensor to generate the respective perturbation tensor, the respective convolution operation being configured by a set of machine-learned respective convolution operation parameters. Generating the final perturbation tensor includes combining repeated final representations of the watermark message to form a final watermark tensor having the same dimensions as the upscaled feature tensor generated by the final intermediate decoding operation, concatenating the final watermark tensor and the upscaled feature tensor generated by the final intermediate decoding operation to form a final concatenated tensor, and performing a final convolution operation on the final concatenated tensor to generate the final perturbation tensor, the final convolution operation being configured by a set of machine-learned final convolution operation parameters.

In at least some example implementations of the preceding examples, the first latent feature tensor, the upscaled feature tensors, and the watermarked image are each represented as a respective matrix, each respective matrix having respective width, height and channel dimension sizes, and combining the repeated first representations of the watermark message to form the first watermark tensor comprises generating a first noise block representation of the watermark message by mapping the watermark message to a noise block that has a same channel dimension size as the first latent feature tensor and smaller width and height dimension sizes than the first latent feature tensor, the repeated first representations each being a repetition of the first noise block representation. For each intermediate decoding operation combining the repeated respective representations of the watermark message to form the respective watermark tensor comprises generating a respective noise block representation of the watermark message by mapping the watermark message to a noise block that has a same channel dimension size as, and smaller width and height dimension sizes than, the upscaled feature tensor generated by the preceding decoding operation, the repeated respective representations each being a repetition of the respective noise block representation. For the final perturbation tensor, combining the repeated final representations of the watermark message to form the first watermark tensor comprises generating a final noise block representation of the watermark message by mapping the watermark message to a noise block that has a same channel dimension size, and smaller width and height dimension sizes than, the upscaled feature tensor generated by the final intermediate decoding operation.

In at least some example implementations of the preceding examples, generating the first latent feature tensor by applying a latent diffusion process in respect of an input prompt that includes at least one of a text prompt and an input image.

In at least some example implementations of the preceding examples, a first latent code is generated by a latent encoder model in respect of an input prompt that includes an input image, and a latent diffusion process is applied to the first latent code to obtain the first latent feature tensor.

In at least some example implementations of the preceding examples, the set of decoding operations are performed by a watermark embedding decoder model, wherein the latent encoder model, the latent diffusion process and the watermark embedding decoder model collectively form a latent diffusion model configured to perform a task selected from a task group including: image super-resolution; inpainting; text-to-image generation; image manipulation; and unconditional generation.

In at least some example implementations of the preceding examples, the set of decoding operations is caused to be performed by a trained watermark embedding decoder model, and the method further includes obtaining the trained watermark embedding decoder model by: receiving first model code and a set of pretrained upscaling parameters that collectively define a pretrained encoder model for causing a set of decoding operations that each include a respective upscaling function that are each configured by a respective subset of the pretrained upscaling parameters; amending the first model code to define a further decoder model that includes, for each decoding operation, a respective watermark embedding feature tensor generating function that is configured by a respective subset of watermark embedding parameters; and learning the respective subsets of watermark embedding parameters to enable the further encoder model to cause generation of watermarked images that are perceptually similar to images that are caused to be generated by the pretrained encoder model in respect of an input set of training latent feature tensors. The the trained watermark embedding decoder model is collectively defined by the amended the first model code, the set of pretrained upscaling parameters, and the learned respective subsets of watermark embedding parameters.

In at least some example implementations of the preceding examples, the method includes processing an input image using a neural network that is configured to extract watermark messages to extract a message from the input image; comparing the extracted message to the watermark message to determine if the extracted message and the watermark message match according to defined criteria; and upon determining that the extracted message and the watermark message match according to the defined criteria, outputting an indication that the input image is watermarked with the watermark message.

According to a further example aspect, a system is disclosed that includes or more processors, and one or more memories storing machine-executable instructions thereon which, when executed by the one or more processors, cause the system to perform the method of any one of the preceding methods.

According to a further example aspect, a non-transitory processor-readable medium is disclosed having machine-executable instructions stored thereon which, when executed by one or more processors, cause the one or more processors to perform the method of any one of the preceding methods.

According to a further example aspect, computer program is disclosed that configures a computer system to perform the method of any one of the preceding methods.

According to a further example aspect, an apparatus is disclosed that is configured to perform the method of any one of the preceding methods.

BRIEF DESCRIPTION OF THE DRAWINGS

Reference will now be made, by way of example, to the accompanying drawings which show example embodiments of the present application, and in which:

FIG. 4 is a flow diagram illustrating operation of the decoder model of the watermark embedding generative model of FIG. 2, according to example implementations.

Similar reference numerals may have been used in different figures to denote similar components.

DESCRIPTION OF EXAMPLE EMBODIMENTS

Figure 1:
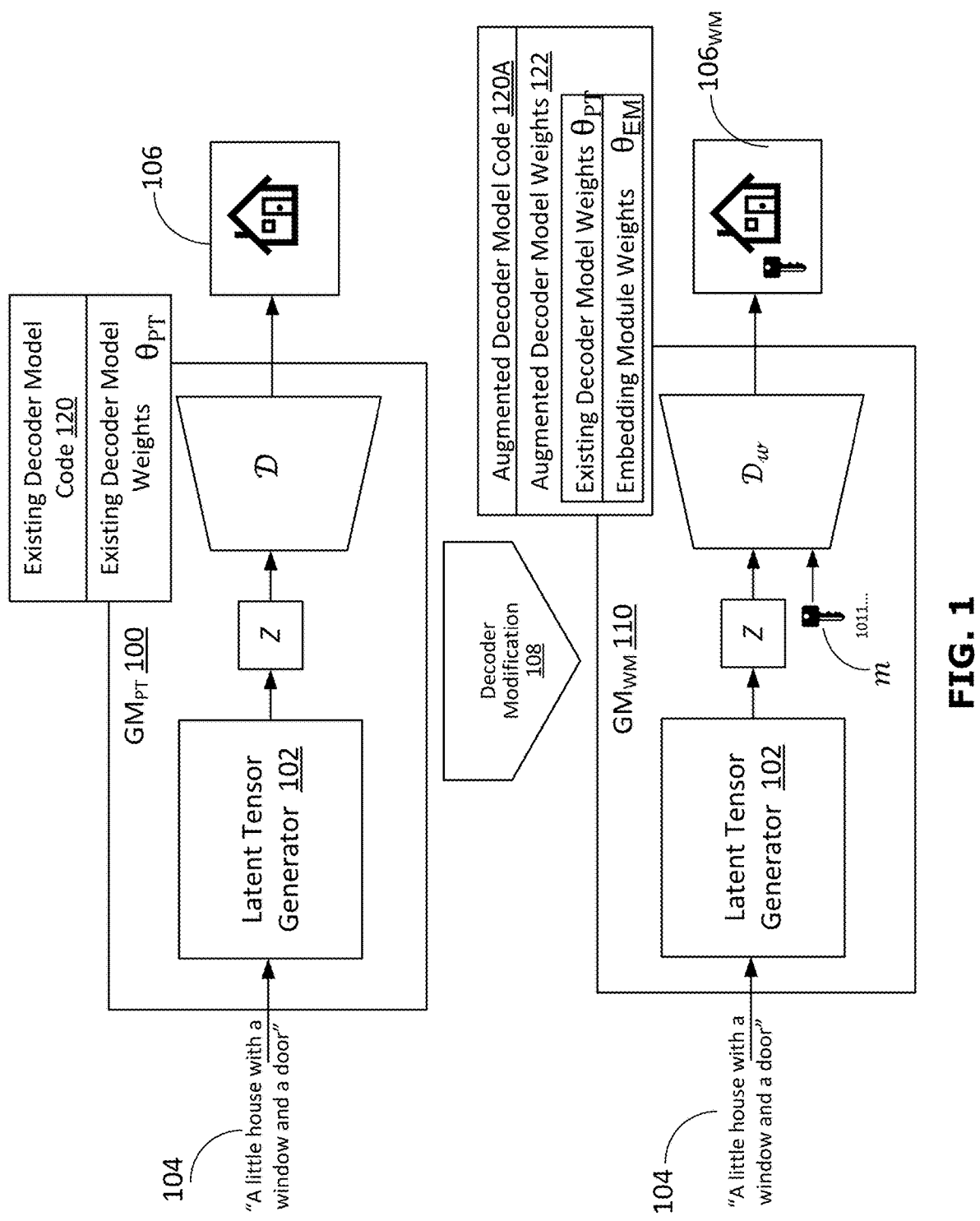
FIG. 1 is a block diagram illustrating a process of generating of a watermark embedding generative model, according to example implementations.

Throughout this disclosure, the following terms can have the following meanings unless context requires otherwise.

Machine Learning: Machine learning refers to a field of study and technology that enables computers and systems to learn and improve performance based on data without being explicitly programmed. It involves the development of algorithms and models that can discover patterns and insights in datasets, allowing systems to make intelligent predictions and decisions.

Model training: training a machine learning model refers to the process of using a large dataset containing samples of a desired task to let the machine learning model learn to perform the desired task.

Pre-trained Model: a machine learning model that has been trained on a large corpus of data (e.g., a training dataset) in advance. A PLM has already learned features and patterns from the training dataset and can be directly used for specific tasks without any further training.

Model Fine-tuning: In the context of machine learning, fine-tuning refers to the process of taking a pre-trained model and further training it on new data to improve its performance on a specific task.

Generative Models: A generative model is a type of statistical model that can generate new data instances.

Prompt (in language models): In the context of image generative models, a "prompt" refers to an initial natural language input or instruction given to the model to guide its generation of output.

Generalization: Generalization refers to the model's ability to adapt properly to new, previously unseen data, drawn from the same distribution as the data used to train and evaluate the model.

Attacks against watermarking: Are malicious attacks on watermarked data which change data such that it may seem okay to a human but cause error in the extracted message from watermarked data.

Model watermarking: A technique to embed a unique identifier into a model in a way that it can be detected but not easily removed. This is typically used to protect intellectual property rights of machine learning models.

DNNs (Deep Neural Networks): A type of artificial neural network that can be used to implement a machine learning model with multiple layers between the input and output layers. Operation of the layers are configured by set of parameters (e.g., model weights) that are learned.

As will be apparent from the description provided below, according to example aspects, the methods and systems for latent-aware image watermarking are the subject of this disclosure that can provide one or more of the following advantageous features.

(1) In-generation watermarking for pre-trained image generation models: examples of the disclosed solution enable a generative model that has already bean trained to be modified so that the modified model can generate images that conceal a watermark message. The modification to add in-generation watermarking can, in at least some examples, be performed without compromising or substantially degrading the original performance of the unmodified model. Modification of an existing pre-trained model eliminates the complicated, costly, and time-consuming training of a new model form scratch. Furthermore, embedding a watermarking step into the image generation task means that no extra post-processing time is required for watermark embedding.

(2) Robust blind image watermarking: examples of the disclosed solution can enable an image to carry an imperceptible watermark such that this message can be accurately extracted from the image even if the watermarked image is modified by common image transformations such as cropping, resizing and format conversion (e.g., to JPEG).

(3) High-capacity blind image watermarking: examples of the disclosed solution can support a high capacity of embedded watermarks without sacrificing the imperceptibility and robustness aspects of the watermark. In at least some examples, the disclosed watermarking methodology can support a certain minimum number of different messages with a specific constraint on the number of false extractions from watermarked images. In the context of an image generation service, this enable the service to support watermarking for a specific number of users while the rate of false detection of real images as AI-generated and false attribution of a watermarked image to the wrong user is kept at a certain level.

(4) Generative model watermarking: examples of the disclosed solution can enable the owner of an image generation model to protect the intellectual property of their model, including a scenario where the owner only has access to images generated by a suspect model without any further knowledge about the details of the model. In this scenario, watermarking that is performed in accordance with the present disclosure enables a model owner to verify if images are generated by their model based on the images, without access to any further information about the model.

(5) Model agnostic: Among other things, one or more examples of the systems and methods disclosed herein are model agnostic for autoencoder (AE) networks; provided that a target generative model is an AE (e.g., an LDM), examples of the disclosed solution can be applied to any image generation model. Examples of the disclosed solution are extensible to different scenarios including in-generation watermarking for AEs, post-generation watermarking for any image, as well as AE model watermarking to protect the intellectual property of the model.

(6) Implementation Simplicity: examples of the disclosed solution only require access to a model decoder to implement and do not require access to or modification of other parts (e.g., the encoder part or the diffusion part in case of LDMs) of the generative model. For the case of LDMs, the diffusion part, which is hard to train and determines the overall performance of the model, need not be modified. Further, the existing pre-trained parameters of the model are kept frozen during the model modification process to assure no damage to the original performance of the model.

FIG. 1 is a block diagram illustrating an example of an original pre-trained generative model $GM_{PT}$ 100 that has been modified using a decoder modification process 108 to generate a watermarking enabled version of the original model, namely a watermarking generative model $GM_{WM}$ 110, according to an example implementation of the present disclosure.

In the illustrative example, generative model $GM_{PT}$ 100 is an image generation model that includes a latent tensor generator 102 and a decoder model $\mathcal{D}$ that are cooperatively configured to generate an output image 106 in response to an input prompt 104. In the illustrated example, latent tensor generator 102 is configured to generate, based on input prompt 104, a latent feature tensor z representation of the image 106. The decoder model $\mathcal{D}$ is configured to apply a multistage decoding process that includes successive decoding operations to generate image 106 that corresponds to the latent feature tensor z. In the illustrated example, latent tensor generator 102 can be configured to apply a machine learned latent diffusion process to the input prompt 104 (e.g., a text prompt) to obtain latent feature tensor z.

In some examples, the latent tensor generator 102 can, for example, include a machine learned encoder model that works in cooperation with the latent diffusion process to obtain latent feature tensor z. By way of example, an encoder model can take an input image and compress it down into a latent code that is then processed by a latent diffusion process. In some examples, latent tensor generator 102 and decoder model $\mathcal{D}$ collectively form a latent diffusion model configured to perform a task selected from the group of: text-to-image generation; image super-resolution; inpainting; image manipulation; and unconditional generation.

In the illustrated example, pre-trained generative model $GM_{PT}$ 100 can take the form of any number of suitable generative model structures. The present disclosure focuses on the decoder model $\mathcal{D}$, which may for example be a transformer-based structure that includes multiple decoder layers, each of which includes a self-attention mechanism and a feed-forward network. Decoder model $\mathcal{D}$ can, for example, be collectively defined by: (i) existing decoder model code 120 and (ii) existing decoder model weights $\theta_{PT}$. The existing decoder model code 120 includes the computer software instructions required to cause a computer system to implement the functionality of decoder model $\mathcal{D}$ in the context of generative model $GM_{PT}$ 100. For example, the decoder model code 120 can include instructions (including hyperparameters) that reference one or more artificial intelligence libraries (e.g., pytorch, tensorflow, jax, mindspore) as required to implement generative model $GM_{PT}$ 100. Existing model weights $\theta_{PT}$ are tensors of parameters that that are learned during pretraining of the decoder model $\mathcal{D}$ in the context of generative model $GM_{PT}$ 100. The operation of each layer of decoder model $\mathcal{D}$ is configured by a respective subset of the model weights $\theta_{PT}$.

In the illustrated example, decoder modification process 108 is configured to modify the original decoder model $\mathcal{D}$ to obtain a watermark embedding decoder model $\mathcal{D}_{w}$ without impacting the existing decoder model weights $\theta_{PT}$. The decoder model $\mathcal{D}_{w}$ can then be deployed as part of watermarking generative model $GM_{WM}$ 110. In example implementations, the original decoder model $\mathcal{D}$ is modified by inserting machine-learning-based embedding modules (described below) into the layers of the original decoder model $\mathcal{D}$, without making any changes to the existing decoder model weights $\theta_{PT}$. The resulting decoder model $\mathcal{D}_{w}$ can be represented by: (i) amended decoder model code 120A, which includes the existing model code with modifications to provide for the inserted embedding modules, and (ii) augmented decoder model weights 122, which includes both the existing decoder model weights $\theta_{PT}$ and a set of embedding module weights $\theta_{EM}$ that configure the inserted embedding modules.

The watermark embedding decoder model $\mathcal{D}_{w}$ is configured to receive the latent feature tensor z representation of input prompt 104 as input, together with a unique watermark message m (e.g., a k-bit key), and output a watermarked image 106$_{WM}$ that embeds watermark message m. In example implementations, the watermark message m is obtained from a watermark database (e.g., a watermark registry) that includes a list of known watermark messages that are each associated with a watermark owner identifier such that each unique watermark message can be attributed to a watermark owner.

Accordingly, in the illustrated example of FIG. 1, a pre-trained generative model (for example, an auto-encoder (AE) model) GM$_{PT}$ 100 that generates images from text or image prompts is modified to enable the model to generate and watermark the images in one step without further post-processing applied to the image. The latent tensor generator 102 of generative model GM$_{PT}$ 100 is configured to generate a latent feature tensor z based on the input prompt 104.

Each latent feature tensor z is then mapped back to an image 106. In the case of pre-trained generative model GM$_{PT}$ 100, the mapping process is done by decoder model ($\mathcal{D}$) that receives input feature tensor z as its input and generates the target image 106. In the example of FIG. 1, decoder modification process 108 modifies the decoder model $\mathcal{D}$ to obtain watermark embedding decoder model $\mathcal{D}_{w}$. Watermark embedding decoder model $\mathcal{D}_{w}$ is configured to receives the watermark message m as an extra input together with latent feature tensor z and generate an image 106$_{WM}$ that will visually match the image 106 generated by original decoder model $\mathcal{D}$, but also carries a watermark.

Figure 2:
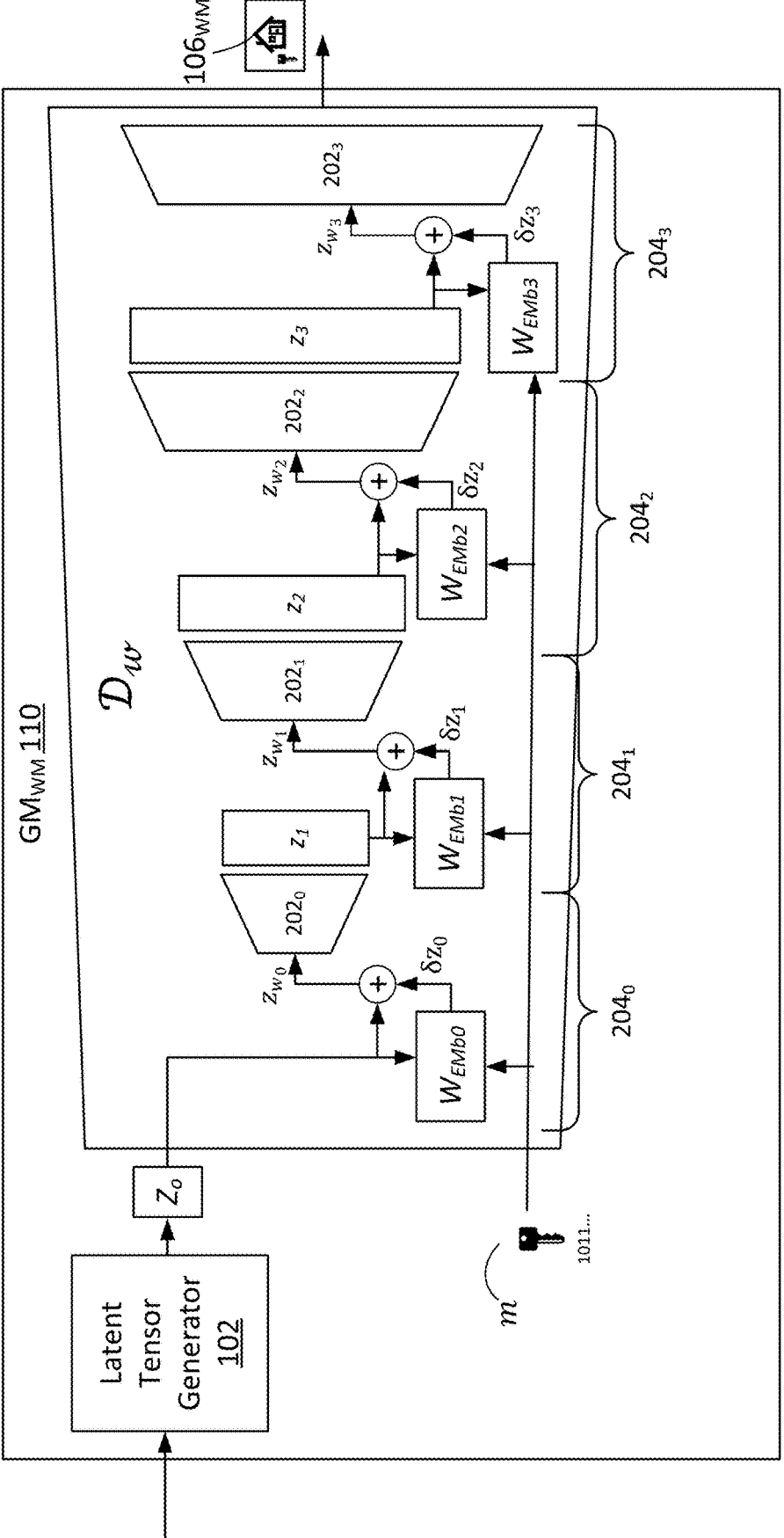
FIG. 2 is a block diagram of an architecture of the watermark embedding generative model generated by the process of FIG. 1, according to example implementations.

FIG. 2 is a block diagram illustrating watermarking generative model GM$_{WM}$ 110 with augmented decoder model $\mathcal{D}_{w}$ shown in greater detail, according to example implementations. In particular, FIG. 2 illustrates an example architecture of decoder model $\mathcal{D}_{w}$ that includes embedding modules W$_{Emb_0}$ to W$_{Emb_{N-1}}$ that have been inserted by decoder modification process 108 into the decoder layers 202$_0$ to 202$_{N-1}$ of the original decoder model $\mathcal{D}$, where N is the number of layers (in FIG. 2, N=4 for illustrative purposes). The original decoder D has multiple (e.g., N) up-scaling steps (also referred to as functions), each performed by a respective decoder layer 202; ((where i∈{0, 1, . . . , N−1}) that are designed to increase the size of height and width of an input feature tensor zi in each step. Decoder modification process 108 adds as respective watermark embedding module W$_{Emb_i}$ before each decoder layer 202$_i$. Each watermark embedding module W$_{Emb_i}$ and respective decoder layer 202$_i$ collectively perform and decoding operation 204$_i$. The addition of a respective watermark embedding module W$_{Emb_i}$ to each up-scaling step performed by a decoder layer 202$_i$ enables multi-scale watermarking, which can better hide the watermark message m in the feature tensor z as it is upscaled through multiple steps.

In the illustrated example, the watermark embedding module W$_{Emb_i}$ at each i$^{th}$ decoder operation 204; receives a feature tensor $z_i$ as well as a k-bit watermark message m∈{0,1}$^k$, and generates a perturbation tensor $\delta z_i$. More formally, perturbation tensor $\delta z_i$=W$_{Emb_i}$($z_i$,m), which is then added to the feature tensor $z_i$ to create a watermark embedding feature tensor $z_{w_i}$=$z_i$+$\delta z_i$. The watermark embedding feature tensor $z_{w_i}$ is then upscaled by decoder layer 202$_i$ to provide an upscaled watermark embedding feature tensor (latent feature tensor) $z_{i+1}$ that is passed to the next decoder operation 202$_{i+1}$.

Figure 3:
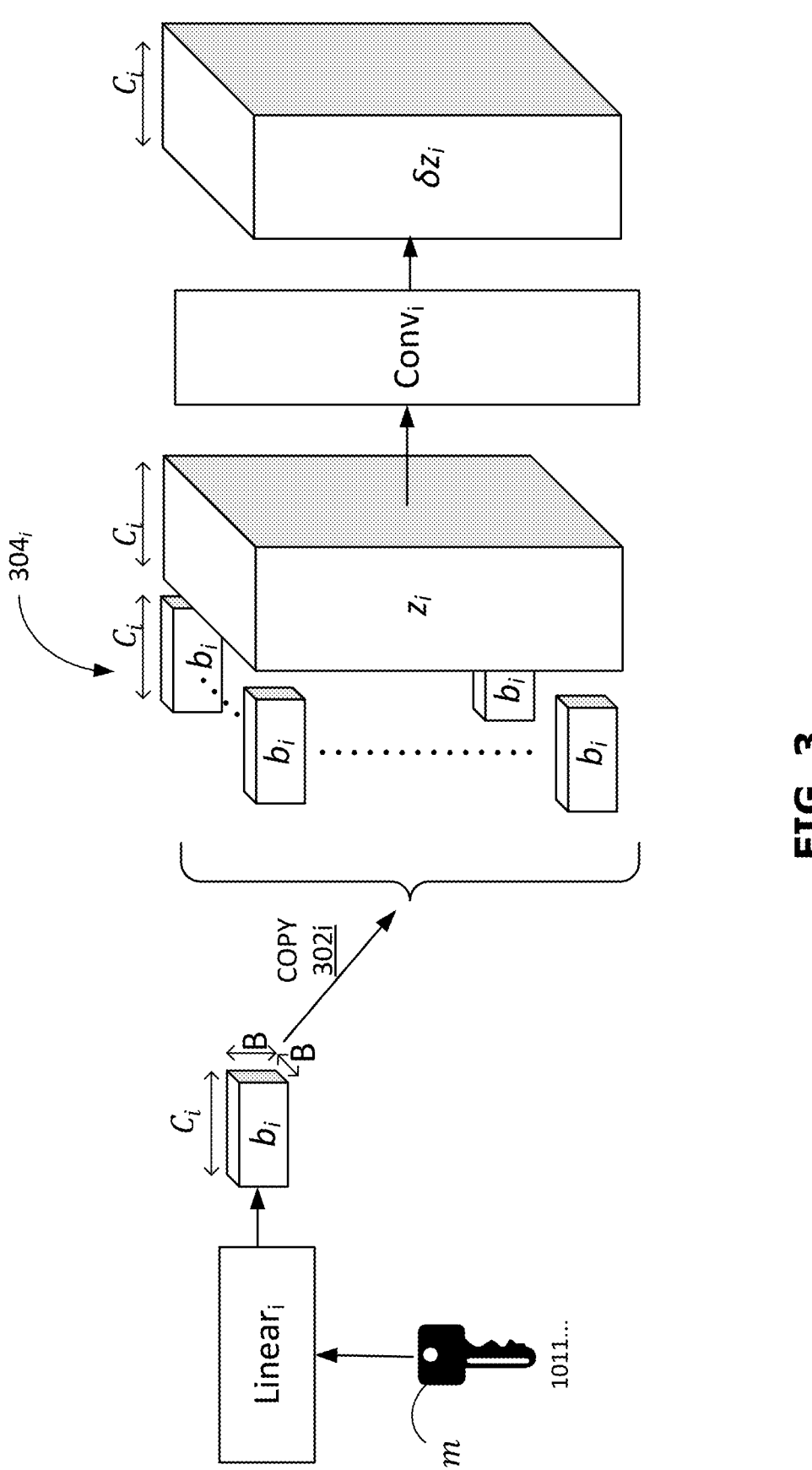
FIG. 3 is a block diagram illustrating operation of a watermark embedding module of a decoder model of the watermark embedding generative model of FIG. 2, according to example implementations.

An example structure of a watermark embedding module W$_{Emb_i}$ is shown in shown in FIG. 3. Watermark embedding module W$_{Emb_i}$ includes a linear mapping operation (Linear$_i$) that maps the watermark message m mapped to a perturbed representation of the watermark message m, namely noise block $b_i$∈$R^{B \times B \times Ci}$, where B is the height and width size of noise block $b_i$ and $C_i$ is the channel size of latent tensor $z_i$ at the i$^{th}$ decoder operation 204$_i$. Watermark embedding module W$_{Emb_i}$ applies a copy operation 302$_i$ to make multiple copies of noise block $b_i$ such that the noise block $b_i$ is repeated along the height and width dimensions of the latent feature tensor $z_i$ to provide a watermarking tensor 304; that has the same height, width and channel dimension sizes as the latent tensor $z_i$. In example implementations, the linear mapping operation (Linear$_i$) can include a matrix multiplication operation that multiplies the watermark message m by a set of learned embedding operation weights. The linear mapping operation (Linear$_i$) and copy operation 302; are collectively configured to map a short k-bit watermark message m to a larger space of size $R^{B \times B \times Ci}$ with more redundancy. This extra redundancy of information helps to improve the robustness of downstream watermark extraction without damaging the visual quality of the resulting image. Furthermore, the repetition of watermark message embedding noise block $b_i$ along the height and width of the latent feature tensor $z_i$ ensures that watermark information is present in all areas of an output image 106$_{WM}$, thereby increasing robustness against more severe random crop attacks.

The watermarking tensor 304; and the latent feature tensor $z_i$ are combined (for example, concatenated) and a convolution operation (Conv$_i$) is applied to the combined tensor to generate perturbation tensor $\delta z_i$ having the same height, width, and channel dimension sizes as the latent tensor $z_i$. The convolution operation (Conv$_i$) can be performed using a set of learned embedding operation weights. The learned weights for the linear mapping operation (Linear$_i$) and the convolution operation (Conv$_i$) collectively from a set of embedding module weights $\delta_{EMi}$ for the watermark embedding module W$_{Emb_i}$.

Referring again to FIG. 2, as noted above, the perturbation tensor $\delta z_i$ is then added to latent tensor $z_i$ to provide watermark embedding feature tensor $z_{w_i}$=$z_i$+$\delta z_i$ which is then fed to decoder layer 202$_i$ that performs an upscaling step to map the watermark embedding feature tensor $z_{w_i}$ to upscaled latent feature tensor $z_{i+1}$.

An overview of watermark embedding decoder model $\mathcal{D}_{w}$ having been provided, further explanation will now be provided with reference to FIG. 4, which illustrates a flow diagram 400 of decoder operations 204$_0$ to 204$_{N-1}$, and reference to above noted FIGS. 2 and 3.

As illustrated in FIG. 2 and FIG. 4, decoder model $\mathcal{D}_{w}$ is configured to perform a set of N decoding operations 204$_0$ to 204$_{N-1}$ generate a watermarked image 106$_{WM}$ corresponding to a first latent feature tensor $z_0$. (Although N=4 in FIG. 2 for illustrative purposes, N can be any suitable number). At a first decoding operation 204$_0$, a first watermark embedding feature tensor $z_{w_0}$ is generated that includes one or more representations of a watermark message m embedded into the first latent feature tensor $z_0$ and the first watermark embedding feature tensor $z_{w_0}$ is then upscaled generate a respective upscaled feature tensor $z_i$.

At each of one or more successive intermediate decoding operations 2041 to 204$_{N-2}$ in the set of decoding operations subsequent to the first decoding operation 204$_0$: a respective intermediate watermark embedding feature tensor $z_{w_i}$ that includes one or more representations of the watermark message m embedded into the upscaled feature tensor $z_i$ generated by a preceding decoding operation $204_{i-1}$ of the set of decoding operations. The respective intermediate watermark embedding feature tensor $z_{w_i}$ is upscaled to generate a further upscaled feature tensor $z_{11}$.

A final decoding operation $204_{N-1}$ in the set of decoding operations is then performed subsequent to a final intermediate decoding operation $204_{N-2}$ of the one or more successive intermediate decoding operations. The final decoding operation $204_{N-1}$ includes: generating a final watermark embedding feature tensor $z_{w_{N-1}}$ that includes one or more representations of the watermark message m embedded into the upscaled feature tensor $z_{N-1}$ generated by the final intermediate decoding operation, and upscaling the respective final watermark embedding feature tensor $z_{W_{N-1}}$ to generate the watermarked image $106_{WM}$.

In the illustrated example, each upscaling is performed by a respective decoder layer 202 of the watermark embedding decoder model $\mathcal{D}_w$ that is configured by a set of machine-learned parameters (weights $\theta_{PT}$).

At each decoding operation $204_i$, a respective watermark embedding module $W_{Emb_i}$ generates a first perturbation tensor $\delta z_i$ that includes multiple perturbed noise block $b_i$ representations of the watermark message m combined with the latent feature tensor $z_i$. The perturbation tensor $\delta z_i$ and the latent feature tensor $z_i$ are then combined to form a respective watermark embedding feature tensor $z_{w_{N-1}}$.

As described above in respect of FIG. 3, at each watermark embedding module $W_{Emb_i}$, generating the respective perturbation tensor $\delta z_i$ includes: combining repeated first representations of the watermark message m to form a respective watermark tensor 304; having the same dimensions as the latent feature tensor $z_i$, concatenating the watermark tensor 304; and the latent feature tensor latent feature tensor $z_i$ to form a concatenated tensor, and performing a convolution operation ($Conv_i$) on the concatenated tensor to generate the perturbation tensor $\delta z_i$.

In example implementations, latent feature tensors $z_i$ and the watermarked image $106_{WM}$ are each represented as a respective matrix of feature values, each respective matrix having respective width, height and channel dimensions. At each watermark embedding module $W_{Emb_i}$, a representation of the watermark message m is obtained by mapping the watermark message m to a noise block $b_i$ that has a same channel dimension size $C_i$ as the latent feature tensor $z_i$ and smaller width and height dimension sizes than the latent feature tensor $z_i$. The noise block $b_i$ is then copied and the copies assembled to provide the respective watermark tensor $304_i$.

In one or more example implementations, the first latent feature tensor $z_o$ is obtained by applying a latent diffusion process in respect of an input prompt 104 that includes at least one of a text prompt and an image.

In one or more example implementations, first latent code is generated by a latent encoder model in respect of input prompt 104 that includes an input image, and a latent diffusion process is applied to the first latent code to obtain the first latent feature tensor $z_o$.

In at least some example implementations, the latent encoder model, the latent diffusion process and the watermark embedding decoder model $\mathcal{D}_w$ collectively form a latent diffusion model configured to perform a task selected from a task group including: image super-resolution; inpainting; text-to-image generation; image manipulation; and unconditional generation.

Obtaining the watermark embedding decoder model $\mathcal{D}_w$ will now be described in greater detail. As shown in FIG. 1, in example implementations, decoder modification process 108 obtains watermark embedding decoder model $\mathcal{D}_w$ by: (i) receiving first model code (existing decoder model code 120) and a set of pretrained upscaling parameters (existing decoder model weights $\delta_{PT}$) that collectively define the pretrained encoder model $\mathcal{D}$; (ii) amending the first model code 120 to define a further model that includes, for each decoding operation $204_i$, a respective watermark embedding feature tensor generating function (e.g., watermark embedding module $W_{Emb_i}$) that is configured by a respective subset $\delta_{EMi}$ of watermark embedding parameters (e.g., embedding module weights $\theta_{EM}$); and (iii) learning the respective subsets of watermark embedding parameters (e.g., embedding module weights $\delta_{EM}$) to enable the further decoder model to cause generation of watermarked images that are perceptually similar to images that are caused to be generated by the pretrained decoder model $\mathcal{D}$ in respect of an input set of training latent feature tensors, the trained watermark embedding decoder model $\mathcal{D}_w$ being collectively defined by the amended first model code (e.g., augmented decoder model code 102A), the set of pretrained upscaling parameters (e.g., existing decoder model weights $\delta_{PT}$), and the learned watermark embedding parameters (e.g., embedding module weights OEM)

Figure 5:
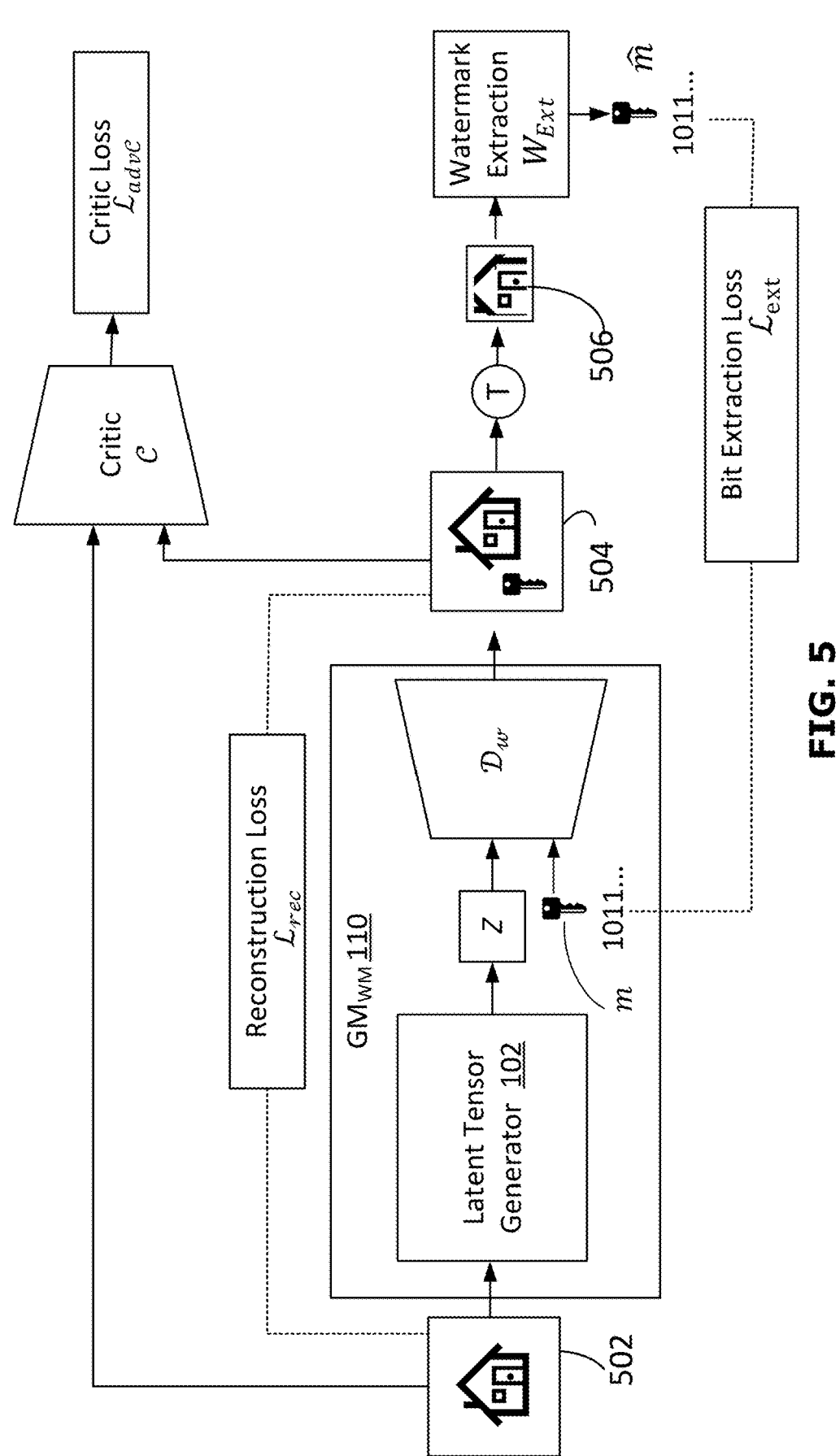
FIG. 5 is a block diagram illustrating training of the decoder model of the watermark embedding generative model of FIG. 2, according to example implementations.

Training of the watermark embedding modules $W_{Emb_i}$ of the watermark embedding decoder model $\mathcal{D}_w$ to obtain embedding module weights $\delta_{EM}$ will now be explained with reference to FIG. 5, together with training of a corresponding watermark extraction model $W_{Ext}$, according to an example implementation. Watermark extraction model $W_{Ext}$ comprises a neural network model that is configured by a set of learned parameters (e.g., extraction model weights) to extract watermark messages from watermarked images.

In the training process, the model parameters of pretrained latent tensor generator 102 and the parameters (e.g., existing decoder model weights $\theta_{PT}$) of the original decoder layers $202_0$ to $202_{N-1}$ from the original generative model $GM_{pt}$ 100 are kept frozen. Benefits of keeping the original model weights can include: minimizing any impact that the addition of and training of watermark embedding modules $W_{Emb_i}$ will have on image generation quality of watermark embedding generative model $GM_{WM}$ 110 relative to the generation quality of the generative model $GM_{pt}$ 100; and enabling a training process that is computationally efficient and model agnostic as retraining of the entire generative model is not required.

In one example, a dataset of prompts is applied to the original pre-trained generative model $GM_{PT}$ 100 to generate a set of non-watermarked images X for use as a training dataset. During training, in some examples a frozen image encoder obtained from the original pre-trained generative model $GM\theta_{PT}$ 100 is used as latent tenor generator 102 to generate latent tensors z in respect of each of the generated image $\hat{x}$ of the set of non-watermarked images $\hat{X}$. The latent tensors z are then mapped back to watermarked images $\hat{x}_w$ using the watermark embedding decoder model $\mathcal{D}_w$, with backpropagation used to iteratively update embedding module weights $\theta_{EM}$ to obtain a desired performance, namely perceptual similarity of watermarked image $\hat{x}_w$ 504 compared to the original generated image $\hat{x}$ 502.

To ensure that the embedding modules are trained in a manner that ensures perceptual similarity of the watermarked image $\hat{x}_w$ 504 compared to the original generated image $\hat{x}$ 502, a combination of pixel-wise distortion and perceptual loss functions are used. For the distortion loss, mean squared error (MSE) ($l_2$ distance) loss defined as $\mathcal{L} = \|\hat{x}_w - \hat{x}\|^2$ is used. For the perceptual loss function, Learned Perceptual Image Patch Similarity (LPIPS) loss is employed to minimize the perceptual distortion between $\hat{x}_w$ and $\hat{x}$. To further improve the quality of the watermarked image, an adversarial critic network $\mathcal{C}$ using Wasserstein Generative Adversarial Network (GAN) is also implemented. Thus, the corresponding adversarial training includes two loss functions as follows:

$$\mathcal{L}_{advD_{wr}} = -E_{\hat{x}_w \sim P_{\hat{x}_w}}[C(\hat{x}_w)], \text{ and } \mathcal{L}_{advC} = E_{\hat{x}_w \sim P_{\hat{x}_w}}[C(\hat{x}_w)] - E_{\hat{x} \sim P_{\hat{x}}}[C(\hat{x})],$$

where $\mathcal{L}_{advC}$ and $\mathcal{L}_{advD_w}$ are the adversarial losses for the critic $\mathcal{C}$ and the modified decoder $\mathcal{D}_{wr}$, respectively. $P_{\hat{x}_w}$ and $P_{\hat{x}}$ are the distribution of the watermarked and original images. The overall reconstruction loss is then defined as:

$$\mathcal{L}_{rec} = \lambda_I \mathcal{L}_I + \lambda_{LPIPS} \mathcal{L}_{LPIPS}(\hat{x}_w, \hat{x}) + \lambda_{adv} \mathcal{L}_{advD_w},$$

where $\lambda_I$, $\lambda_{LPIPS}$, and $\lambda_{adv}$ are the relative loss weights. In an example implementation, based on experimentation, the loss weights can, for example, be set to $\lambda_I=0.1$, $\lambda_{LPIPS}=1.0$, and $\lambda_{adv}=1.0$.

In example implementation, the watermark extractor $W_{Ext}$ is configured to be robust to different image modifications and attacks. In this regard, in an example implementation, after the watermarked image 504 is generated, a transformation T is randomly sampled from a set of differentiable transformations, $\tau$, including common image processing attacks. The selected transformation is then applied to the image 504 and the transformed image 506 is passed through a watermark extraction neural network implemented by watermark extractor $W_{Ext}$. In an illustrated example, watermark extractor $W_{Ext}$ s based on ResNet50 architecture with the last linear layer changed to output a k-bit message. The output extracted watermark message, $\hat{m}=W_{Ext}(T(\hat{x}))$, should match the original embedded watermark message m. The extraction loss is defined as the binary cross entropy (BCE) loss between m and $\hat{m}$, $\mathcal{L}_{Ext}=\mathcal{L}_{BCE}(m,\hat{m})$. The final embedding module weights $\delta_{EM}$ and final extraction model weights are then optimized to minimize the following total loss:

$$\mathcal{L} = \mathcal{L}_{rec} + \lambda \mathcal{L}_{ext},$$

where $\lambda$ is the loss weight to control the trade-off between extraction accuracy and image reconstruction quality. In one example, $\lambda=2.0$, which is obtained experimentally.

Figure 6:
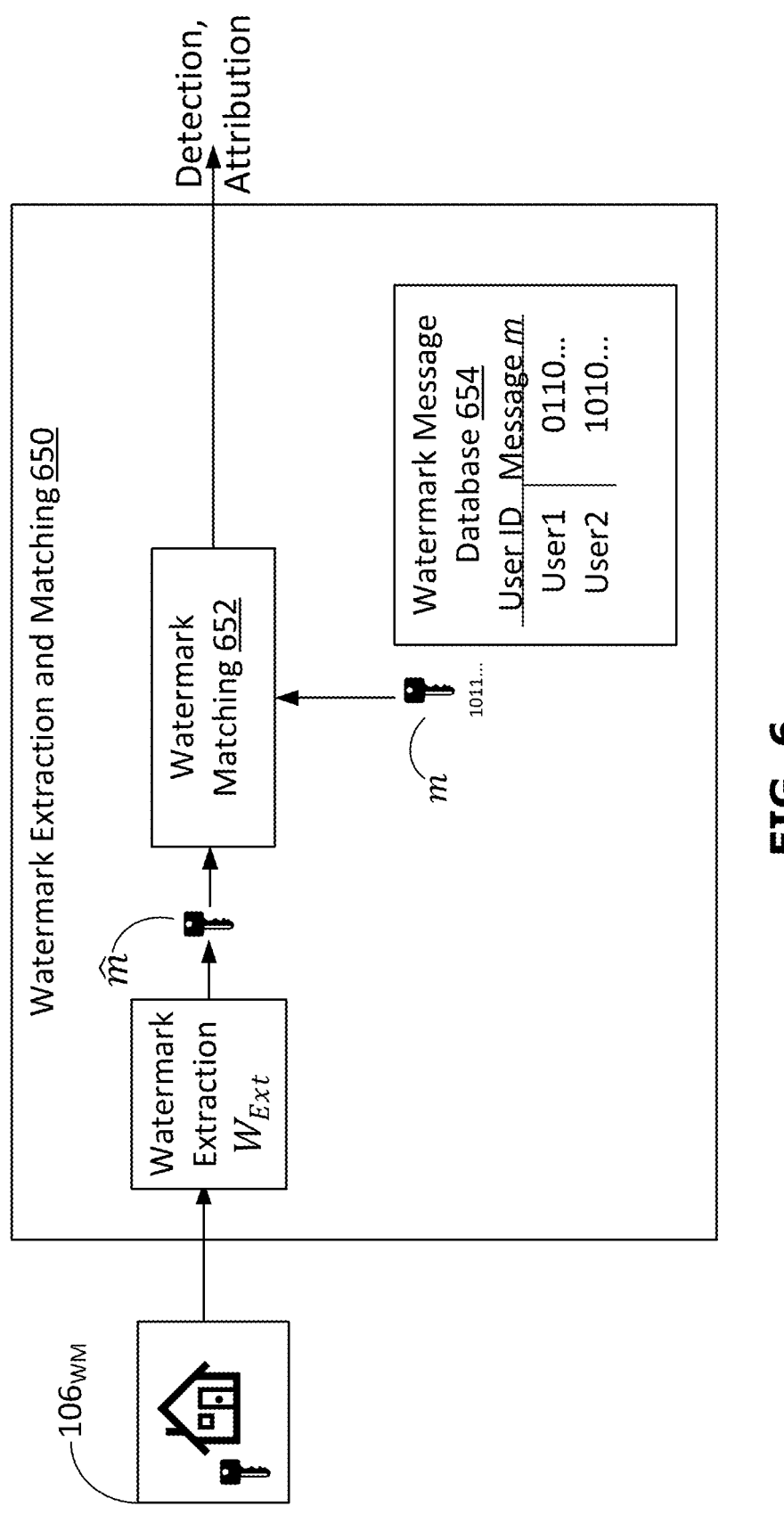
FIG. 6 is a block diagram illustrating a watermark extraction and matching process, according to example implementations.

A watermarking extraction and matching process 650 that incorporates watermark extractor $W_{Ext}$ and a watermark matching operation 652 is illustrated in FIG. 6. As noted above, in example implementations, watermark message m is stored in a watermark message database 654 of known watermarks. In example implementations, the watermark extractor $W_{Ext}$ is configured to extract any of the unique watermark messages from the set of predefined unique watermark messages that are included in the watermark message database. Given an image 106$_{WM}$, at watermark extraction time, watermark extractor $W_{Ext}$ extracts and decodes the watermark message $\hat{m}$. Watermarking matching operation 652 then attempts to match the extracted watermark message m with one of existing original messages (i.e., m) stored in the watermark message database. In an example implementation, watermarking matching operation 652 applies a soft matching method defined as: $M(\hat{m},m) \geq n$, where $n \in \{0, \ldots, k\}$, where $M(\hat{m},m)$ counts the number of matching bits in m and m, and n is the threshold for flagging a match. Such a soft matching method can, for example, increase the matching robustness against image modifications. A positive match can be used to: (i) confirm that the image 106$_{WM}$ has been generated using the generative model GM$_{WM}$ 110 (e.g., detection of an AI generated image); and (ii) attribute the image 106$_{WM}$ to the user ID that is associated with the watermark message m.

Example application scenarios of the watermarking embedding and extraction methods and systems presented above will now be described.

Figure 7:
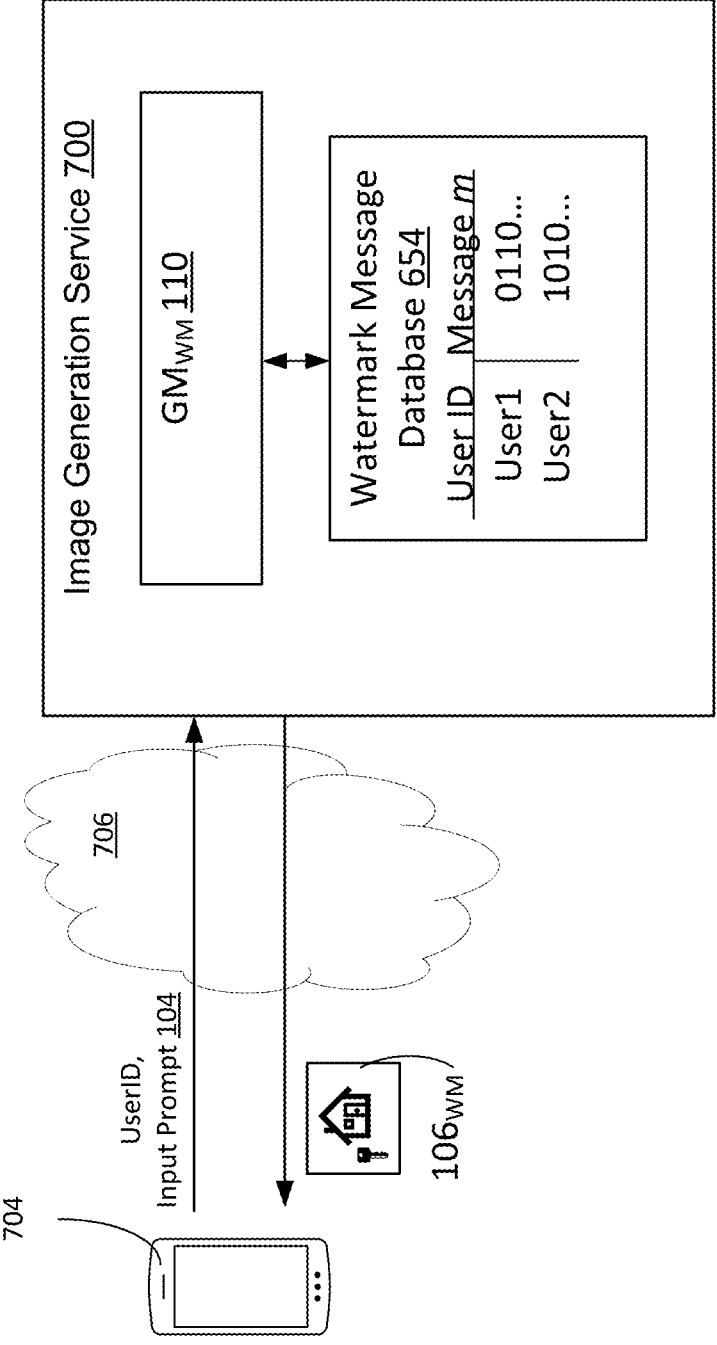
FIG. 7 is a block diagram illustrating an image generation service, according to example implementations.

In first application scenario, represented in FIG. 7, a service provider operates an image generation service 700 that is hosted by a web-based server and can be accessed by a user device 704 via a communications network 706 through an API interface. The image generation service 700 provides in-generation watermarking. The user device 704 provides an input prompt 104 and user ID data to the image generation service 700. The image generation service 700 associates the user ID with a unique watermark message m and stores the associated user ID and watermark message m in a watermark message database 654. A watermarking enabled generative model GM$_{WM}$ 110 of the on-line image generation service 700 is provided with the input prompt 104 and the unique watermark message m, and generates a corresponding watermarked image 106$_{WM}$ that is returned to the user device 704. At any point in the future, the watermarked image 106$_{WM}$ can be analyzed using watermark extraction and matching process 650 as described above to both confirm that the image 106$_{WM}$ has been generated using the generative model GM$_{WM}$ 110 and attribute the image 106$_{WM}$ to a specific user ID. The watermark extraction and matching process 650 can, for example, also be hosted as an on-line service by the same service provider that operates on-line image generation service 700.

Figure 8:
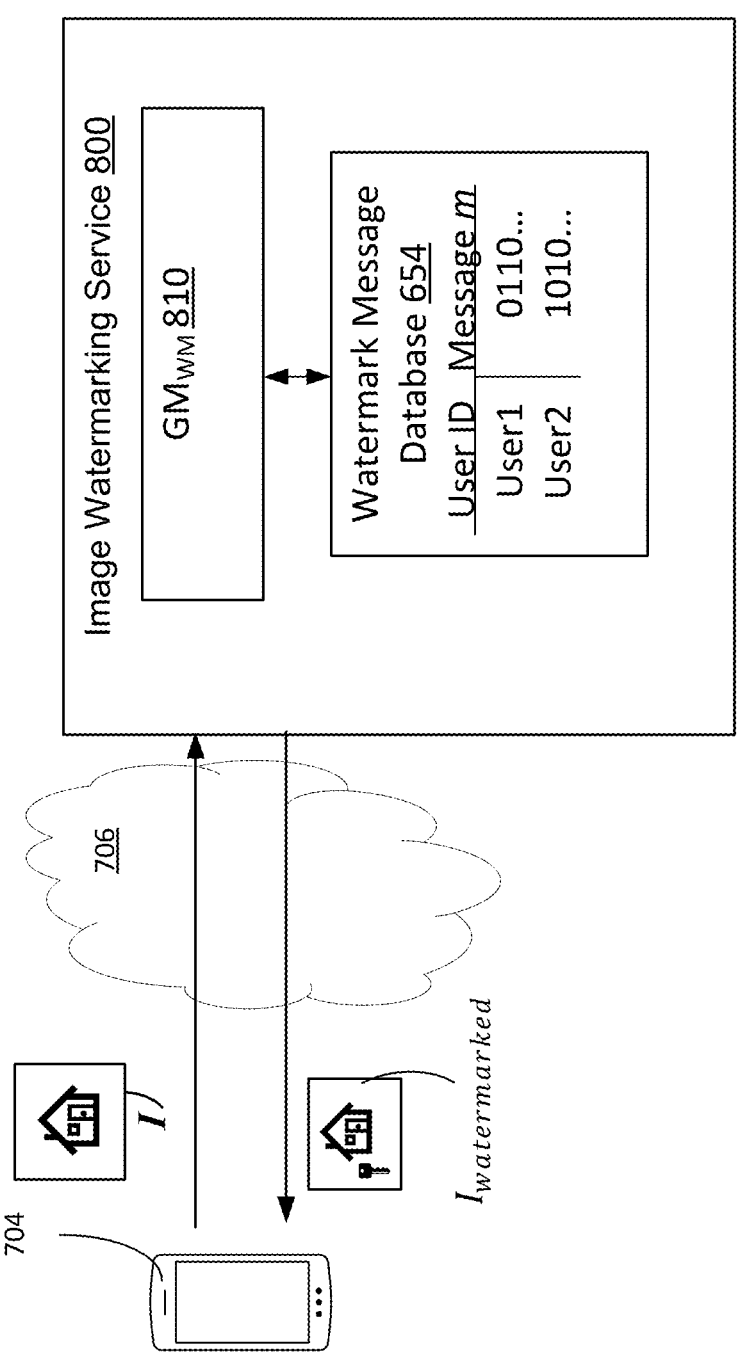
FIG. 8 is a block diagram illustrating an image watermarking service, according to example implementations.

In a second application scenario, represented in FIG. 8, an image watermarking service 800 is provided that applies post-image generation watermark message to an input image I. The input image I can, for example, be a real image or an artificial intelligence (AI) generated image. The watermarking service 800 associates an ID (e.g., a user ID) with a unique watermark message m and stores the associated ID and watermark message m in a watermark message database 654. A watermarking enabled generative model GM$_{WM}$ 810 processes the input image 820 and the unique watermark message m, and generates a corresponding watermarked image I$_{watermarked}$.

Figure 9:
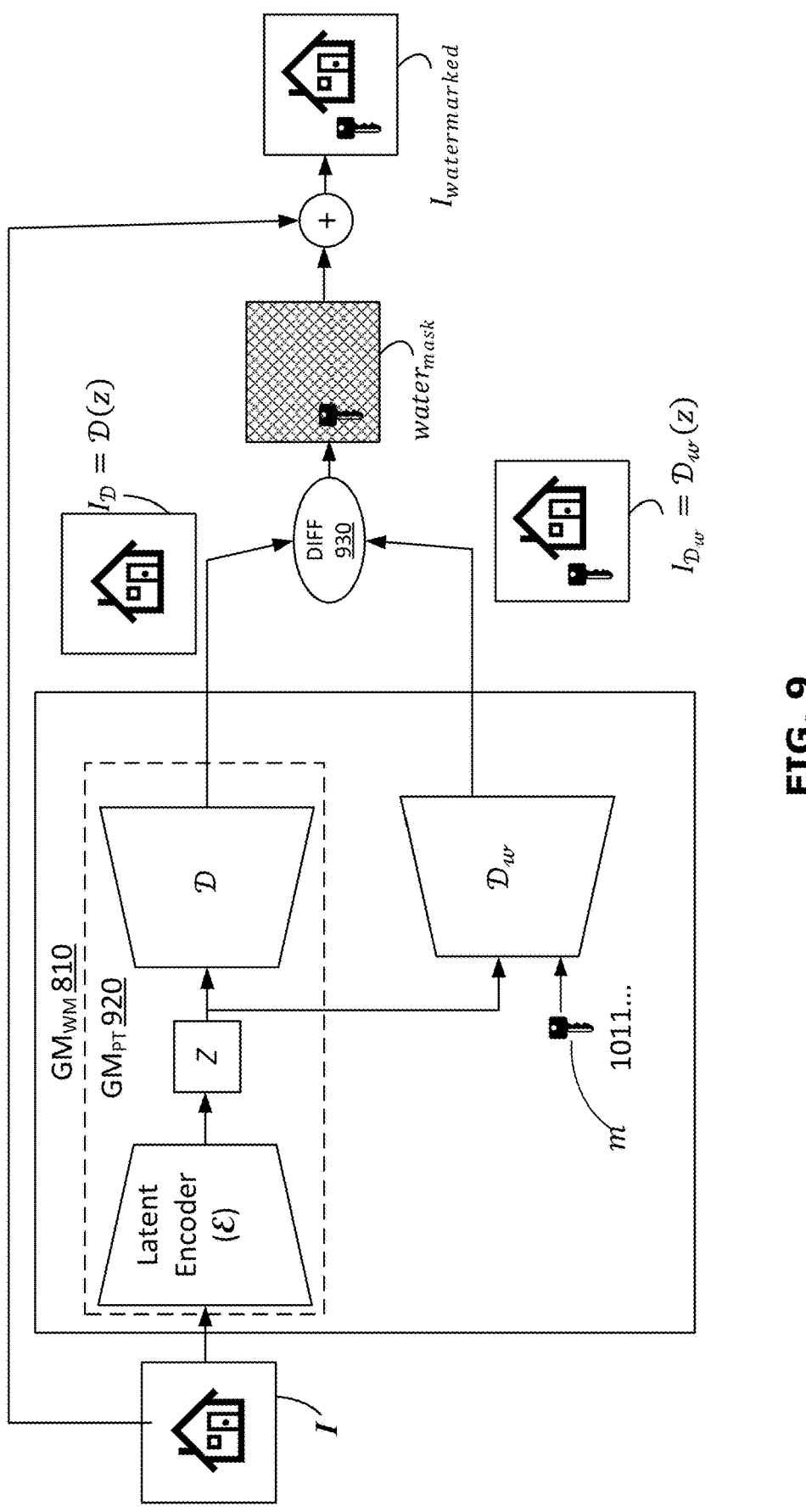
FIG. 9 is a block diagram illustrating aspects of the image generation service of FIG. 8, according to example implementations.

In this regard, FIG. 9 illustrates the watermarking enabled generative model GM$_{WM}$ 810 in greater detail. The generative model GM$_{WM}$ 810 is configured to perform post-image-generation watermark message embedding into images that can be either real images or AI generated images. The generative model GM$_{WM}$ 810 incorporates a non-watermarking version of a pretrained generative model GM$_{PT}$ 920 is an auto-encoder model that includes a latent encoder model E for generating a latent feature tensor z in respect of an input image I, and a pre-trained decoder model $\mathcal{D}$ for mapping the latent feature tensor z to an image $I_D$ that is a reconstituted version of input image I. The pretrained generative model GM$_{PT}$ 920 is trained to perform as an identity function such that the reconstituted image $I_D$ matches the input image I. In other words, the pretrained generative model GM$_{PT}$ 920 is trained to map an image to a feature tensor z using the encoder model $\varepsilon$ and map the feature tensor z back to the image using the decoder model $\mathcal{D}$.

The generative model $GM_{WM}$ 810 also incorporates a watermarking version of the decoder model $\mathcal{D}$, namely watermark embedding decoder model $\mathcal{D}_{w}$. The watermark embedding decoder model $\mathcal{D}_{w}$ has been trained to decode feature tensor z and embed a supplied watermark message m into a resulting image $I_{\mathcal{D}_{w}}$ as described above in respect of FIG. 5.

When the generative model $GM_{WM}$ 810 processes input image I (which as noted above can be AI-generated or real), the latent encoder model E maps the input image I to feature tensor z. The feature tensor z is then processed separately by both the original decoder model $\mathcal{D}$ and the watermark embedding decoder model $\mathcal{D}_{w}$. Original decoder model $\mathcal{D}$ maps feature tensor z to reconstituted image $I_{D}=\mathcal{D}(z)$, and the watermark embedding decoder model $\mathcal{D}_{w}$ maps the feature tensor z to watermark embedding image $I_{\mathcal{D}_{w}}=\mathcal{D}_{w}(z)$. A difference operation 930 is applied to the two images to obtain a watermark mask, $water_{mask}=I_{D}-I_{\mathcal{D}_{w}}$. The original input image I is then combined with the watermark mask $water_{mask}$ to obtain watermarked image $I_{watermarked}=I+water_{mask}$. This can be used as a post-generation image watermarking for any AIGC image generation service. In example implementations, apart from the addition of watermark data, the authenticity of the original image I is maintained and the watermark message is imperceptibly, from human vision perspective, embedded into original image I. The image can be AI-generated or real.

Figure 10:
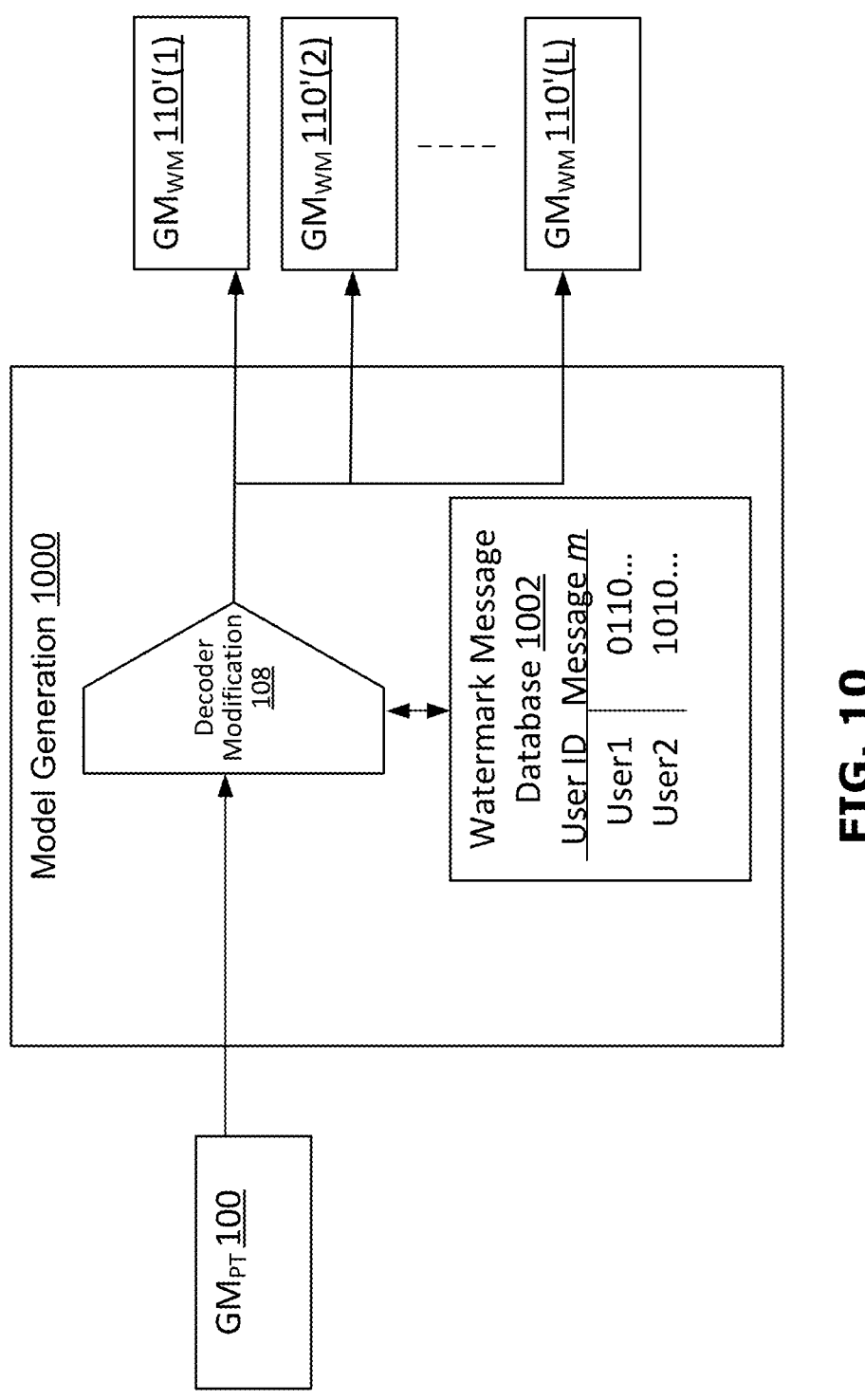
FIG. 10 is a block diagram illustrating a model generation process, according to example implementations.

A third example application scenario is illustrated in FIG. 10. In such a scenario, a first entity owns a pre-trained image generation model $GM_{PT}$ 100 that has been extensively trained using a proprietary database. The first entity is interested to sell this model to third party users for their private applications, but the first entity also wants to protect its ownership of the model against illegal distribution of the model by the third-party users.

In the example of FIG. 10, a model generation process 1000 is applied to generate multiple user-specific versions, namely watermarking embedding generative models $GM_{WM}$ 110'(1) to $GM_{WM}$ 110'(L), of the original pre-trained image generation model $GM_{PT}$ 100. In the illustrated example, decoder modification process 108 is repeatedly applied to original pre-trained image generation model $GM_{PT}$ 100 to generate each of the respective user-specific watermarking embedding generative models $GM_{WM}$ 110'(1) to $GM_{WM}$ 110'(L). However, in the example of FIG. 10, the decoder model $\mathcal{D}_{w}$ of each respective watermarking embedding generative models $GM_{WM}$ 110'(1) to $GM_{WM}$ 110'(L) is trained to only embed a user specific watermark message m that is assigned for the specific model and tracked in a watermark message database 1002.

In particular, for each new user-specific watermarking embedding generative model $GM_{WM}$ 110'(l), a user-specific watermark message m(l) is selected and fixed for that model. The watermark embedding modules $W_{Emb}$ that are inserted and trained for each respective model $GM_{WM}$ 110'(l) are configured to add the user-specific watermark message m(l) to each image generated by that model. Unlike the watermarking embedding generative models $GM_{WM}$ 110 described above that can receive and embed image-specific watermarking messages, a trained and deployed user-specific watermarking embedding generative model $GM_{WM}$ 110'(l) is configured to only embed a single, pre-defined, model-specific watermark message m(l) into all the images that it generates. The model provided to each user contains their specific intermediate watermarking layers and creates images that carry the client-specific watermarks.

The first entity (e.g., model owner) can then use watermark extraction and matching process 650 to process images that the model owner may suspect as being generated by unauthorized versions of their model. If the extracted watermark message from a threshold number of images matches a client-specific watermark message m(l), then the first entity has evidence that the images were produced by user-specific watermarking embedding generative model $GM_{WM}$ 110'(l) that has been sourced from a specific user(l). Accordingly, the first entity can identify if their model is being used in an authorized manner and who is behind the unauthorized usage, only with access to images generated by the offending model.

It will be apparent from the above description that the methods and systems described above can provide, in various implementations: an in-generation watermarking methodology for image generation models in which the generative models creates images that conceal watermarking without the need for post-processing, but which can also alternatively be applied in a post-generation environment; a general image watermarking method that is robust to image modification and does not damage the perceptual quality of the images; and a model watermarking method for image generation models in which the ownership of a model can be verified by only API access to the generated images.

Figure 11:
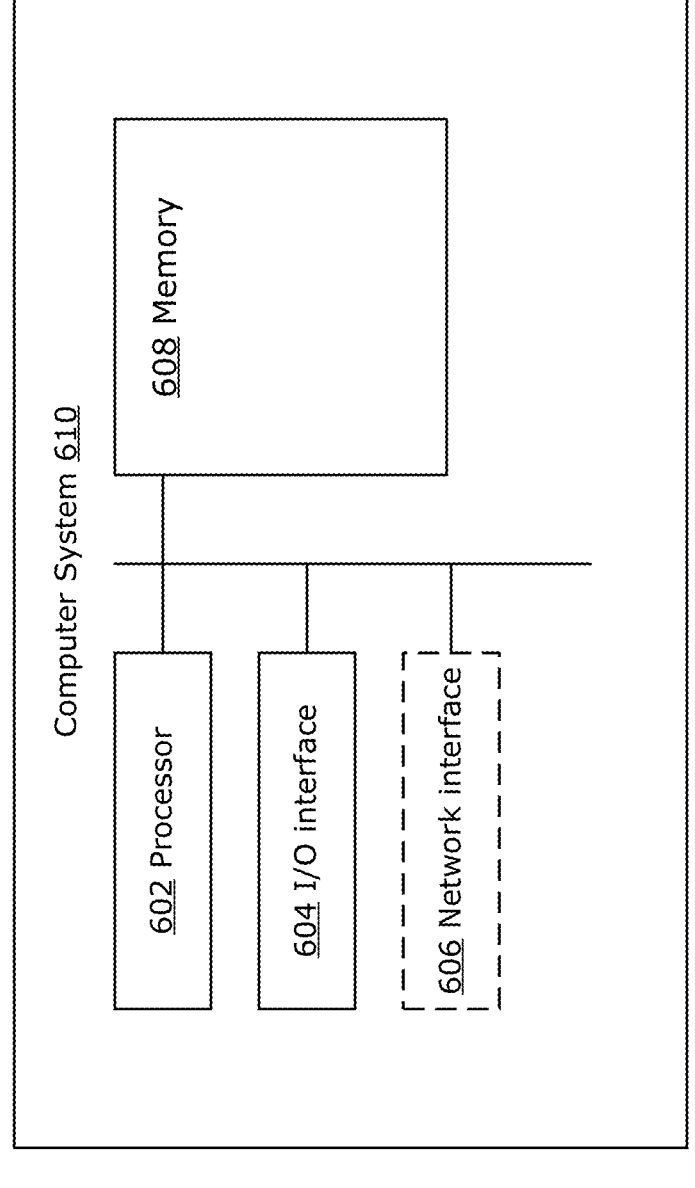
FIG. 11 is a block diagram of a computer system that can be configured to implement aspects of the disclosed methods and systems.

FIG. 11 illustrates an example of a computer system 610 that can be used to implement the one or more systems of the present disclosure, including for example a system that is used to perform decoder modification process 108, a system that used to perform watermark extraction and matching process 650, a system that hosts image generation services 700, a system that hosts image watermarking services 800, and/or a system that performed model generation process 1000. Computer system 610 includes one or more processors 602, such as a central processing unit, a general processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 602 may collectively be referred to as a "processor device". The computer system 610 also includes one or more input/output (I/O) interfaces 604, which interfaces with input devices (e.g., microphone) and output devices (e.g., speaker, display).

The computer system 610 can include one or more network interfaces 606 that may, for example, enable the computer system 610 to communicate with one or more further devices through a communications network such as a local area wireless network.

The computer system 610 includes one or more memories 608, which may include a volatile or non-volatile memory (e.g., a flash memory, a random access memory (RAM), and/or a read-only memory (ROM)). The non-transitory memory(ies) 608 may store instructions for execution by the processor(s) 602, such as to carry out examples described in the present disclosure. The memory(ies) 608 may include other software instructions, such as for implementing an operating system and other applications/functions. In the illustrated example, the memory 608 includes specialized software instructions 1161 for implementing one or more of watermarked PLM 100, watermark layer insertion process 302, or and/or watermark-as-a-service 500.

In some examples, the computer system 610 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the computer system 610) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the computer system 610 may communicate with each other via a bus, for example.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The terms "substantially" and "approximately" as used in this disclosure can mean that the recited characteristic, parameter, or value need not be achieved exactly, but that deviations or variations including for example, tolerances, measurement error measurement accuracy limitations and other factors known to those skilled in the art, may occur in amounts that do not preclude the effect the characteristic was intended to provide. By way of illustration, in some examples, the terms "substantially" and "approximately", can mean a range of within 5% of the stated characteristic.

As used herein, statements that a second item is "based on" a first item can mean that properties of the second item are affected or determined at least in part by properties of the first item. The first item can be considered an input to an operation or calculation, or a series of operations or calculations that produces the second item as an output that is not independent from the first item.

The contents of all published documents identified in this disclosure are incorporated herein by reference.

The invention claimed is:

1. A computer-implemented method of digital image watermarking comprising:
   performing a set of decoding operations to generate a watermarked image corresponding to a first latent feature tensor, comprising:
      performing a first decoding operation in the set of decoding operations, comprising:
         generating a first watermark embedding feature tensor that includes one or more representations of a watermark message embedded into the first latent feature tensor, and
         upscaling the first watermark embedding feature tensor to generate a respective upscaled feature tensor;
      performing one or more successive intermediate decoding operations in the set of decoding operations subsequent to the first decoding operation, each respective intermediate decoding operation comprising:
         generating a respective intermediate watermark embedding feature tensor that includes one or more representations of the watermark message embedded into the upscaled feature tensor generated by a preceding decoding operation of the set of decoding operations, and
         upscaling the respective intermediate watermark embedding feature tensor to generate a further upscaled feature tensor;
      and
      performing a final decoding operation in the set of decoding operations subsequent to a final intermediate decoding operation of the one or more successive intermediate decoding operations, the final decoding operation comprising:
         generating a final watermark embedding feature tensor that includes one or more representations of the watermark message embedded into the upscaled feature tensor generated by the final intermediate decoding operation, and
         upscaling the respective final watermark embedding feature tensor to generate the watermarked image.

2. The method of claim 1 wherein each upscaling is performed by a respective layer of a multi-layer decoder model that is configured by a set of machine-learned parameters.

3. The method of claim 1 wherein:
   generating the first watermark embedding feature tensor comprises:
      generating a first perturbation tensor that includes multiple perturbed representations of the watermark message combined with the first latent feature tensor, and
      combining the first perturbation tensor and the first latent feature tensor to form the first watermark embedding feature tensor;
   for each intermediate decoding operation, generating the respective intermediate watermark embedding feature tensor comprises:
      generating a respective perturbation tensor that includes multiple perturbed representations of the watermark message combined with the upscaled feature tensor generated by the preceding decoding operation, and combining the respective perturbation tensor and the upscaled feature tensor generated by the preceding decoding operation to form the respective intermediate watermark embedding feature tensor; and generating the final watermark embedding feature tensor comprises:

generating a final perturbation tensor that includes multiple perturbed representations of the watermark message combined with the upscaled feature tensor generated by the final intermediate decoding operation, and combining the final perturbation tensor and the upscaled feature tensor generated by the final intermediate decoding operation to form the final watermark embedding feature tensor.

4. The method of claim 3 wherein:

generating the first perturbation tensor comprises:

combining repeated first representations of the watermark message to form a first watermark tensor having the same dimensions as the first latent feature tensor, concatenating the first watermark tensor and the first latent feature tensor to form a first concatenated tensor, and performing a first convolution operation on the first concatenated tensor to generate the first perturbation tensor, the first convolution operation being configured by a set of machine-learned first convolution operation parameters;

for each intermediate decoding operation, generating the respective perturbation tensor comprises:

combining repeated respective representations of the watermark message to form a respective watermark tensor having the same dimensions as the upscaled feature tensor generated by the preceding decoding operation, concatenating the respective watermark tensor and the upscaled feature tensor generated by the preceding decoding operation to form a respective concatenated tensor, and performing a respective convolution operation on the respective concatenated tensor to generate the respective perturbation tensor, the respective convolution operation being configured by a set of machine-learned respective convolution operation parameters; and generating the final perturbation tensor comprises:

combining repeated final representations of the watermark message to form a final watermark tensor having the same dimensions as the upscaled feature tensor generated by the final intermediate decoding operation, concatenating the final watermark tensor and the upscaled feature tensor generated by the final intermediate decoding operation to form a final concatenated tensor, and performing a final convolution operation on the final concatenated tensor to generate the final perturbation tensor, the final convolution operation being configured by a set of machine-learned final convolution operation parameters.

5. The method of claim 4 wherein the first latent feature tensor, the upscaled feature tensors, and the watermarked image are each represented as a respective matrix, each respective matrix having respective width, height and channel dimension sizes:

wherein when generating the first perturbation tensor, combining the repeated first representations of the watermark message to form the first watermark tensor comprises generating a first noise block representation of the watermark message by mapping the watermark message to a noise block that has a same channel dimension size as the first latent feature tensor and smaller width and height dimension sizes than the first latent feature tensor, the repeated first representations each being a repetition of the first noise block representation;

wherein, for each intermediate decoding operation, when generating the respective perturbation tensor, combining the repeated respective representations of the watermark message to form the respective watermark tensor comprises generating a respective noise block representation of the watermark message by mapping the watermark message to a noise block that has a same channel dimension size as, and smaller width and height dimension sizes than, the upscaled feature tensor generated by the preceding decoding operation, the repeated respective representations each being a repetition of the respective noise block representation; and wherein when generating the final perturbation tensor, combining the repeated final representations of the watermark message to form the first watermark tensor comprises generating a final noise block representation of the watermark message by mapping the watermark message to a noise block that has a same channel dimension size, and smaller width and height dimension sizes than, the upscaled feature tensor generated by the final intermediate decoding operation.

6. The method of claim 1 further comprising:

generating the first latent feature tensor by applying a latent diffusion process in respect of an input prompt that includes at least one of a text prompt and an input image.

7. The method of claim 1 wherein a first latent code is generated by a latent encoder model in respect of an input prompt that includes an input image, and a latent diffusion process is applied to the first latent code to obtain the first latent feature tensor.

8. The method of claim 7 wherein the set of decoding operations are performed by a watermark embedding decoder model, wherein the latent encoder model, the latent diffusion process and the watermark embedding decoder model collectively form a latent diffusion model configured to perform a task selected from a task group including: image super-resolution; inpainting; text-to-image generation; image manipulation; and unconditional generation.

9. The method of claim 1 wherein the set of decoding operations is caused to be performed by a trained watermark embedding decoder model, the method further comprising obtaining the trained watermark embedding decoder model by:

receiving first model code and a set of pretrained upscaling parameters that collectively define a pretrained encoder model for causing a set of decoding operations that each include a respective upscaling function that are each configured by a respective subset of the pretrained upscaling parameters;

amending the first model code to define a further decoder model that includes, for each decoding operation, a respective watermark embedding feature tensor generating function that is configured by a respective subset of watermark embedding parameters; and learning the respective subsets of watermark embedding parameters to enable the further encoder model to cause generation of watermarked images that are perceptually similar to images that are caused to be generated by the pretrained encoder model in respect of an input set of training latent feature tensors, the trained watermark embedding decoder model being collectively defined by the amended the first model code, the set of pretrained upscaling parameters, and the learned respective subsets of watermark embedding parameters.

10. The method of claim 1 further comprising:

processing an input image using a neural network that is configured to extract watermark messages to extract a message from the input image;

comparing the extracted message to the watermark message to determine if the extracted message and the watermark message match according to defined criteria; and upon determining that the extracted message and the watermark message match according to the defined criteria, outputting an indication that the input image is watermarked with the watermark message.

11. A system comprising:

one or more processors; and one or more memories storing machine-executable instructions thereon which, when executed by the one or more processors, cause the system to perform a method comprising:

performing a set of decoding operations to generate a watermarked image corresponding to a first latent feature tensor, comprising:

performing a first decoding operation in the set of decoding operations, comprising:

generating a first watermark embedding feature tensor that includes one or more representations of a watermark message embedded into the first latent feature tensor, and upscaling the first watermark embedding feature tensor to generate a respective upscaled feature tensor;

performing one or more successive intermediate decoding operations in the set of decoding operations subsequent to the first decoding operation, each respective intermediate decoding operation comprising:

generating a respective intermediate watermark embedding feature tensor that includes one or more representations of the watermark message embedded into the upscaled feature tensor generated by a preceding decoding operation of the set of decoding operations, and upscaling the respective intermediate watermark embedding feature tensor to generate a further upscaled feature tensor; and performing a final decoding operation in the set of decoding operations subsequent to a final intermediate decoding operation of the one or more successive intermediate decoding operations, the final decoding operation comprising:

generating a final watermark embedding feature tensor that includes one or more representations of the watermark message embedded into the upscaled feature tensor generated by the final intermediate decoding operation, and upscaling the respective final watermark embedding feature tensor to generate the watermarked image.

12. The system of claim 11 wherein each upscaling is performed by a respective layer of a multi-layer decoder model that is configured by a set of machine-learned parameters.

13. The system method of claim 11 wherein:

generating the first watermark embedding feature tensor comprises:

generating a first perturbation tensor that includes multiple perturbed representations of the watermark message combined with the first latent feature tensor, and combining the first perturbation tensor and the first latent feature tensor to form the first watermark embedding feature tensor;

for each intermediate decoding operation, generating the respective intermediate watermark embedding feature tensor comprises:

generating a respective perturbation tensor that includes multiple perturbed representations of the watermark message combined with the upscaled feature tensor generated by the preceding decoding operation, and combining the respective perturbation tensor and the upscaled feature tensor generated by the preceding decoding operation to form the respective intermediate watermark embedding feature tensor; and generating the final watermark embedding feature tensor comprises:

generating a final perturbation tensor that includes multiple perturbed representations of the watermark message combined with the upscaled feature tensor generated by the final intermediate decoding operation, and combining the final perturbation tensor and the upscaled feature tensor generated by the final intermediate decoding operation to form the final watermark embedding feature tensor.

14. The system of claim 13 wherein:

generating the first perturbation tensor comprises:

combining repeated first representations of the watermark message to form a first watermark tensor having the same dimensions as the first latent feature tensor, concatenating the first watermark tensor and the first latent feature tensor to form a first concatenated tensor, and performing a first convolution operation on the first concatenated tensor to generate the first perturbation tensor, the first convolution operation being configured by a set of machine-learned first convolution operation parameters;

for each intermediate decoding operation, generating the respective perturbation tensor comprises:

combining repeated respective representations of the watermark message to form a respective watermark tensor having the same dimensions as the upscaled feature tensor generated by the preceding decoding operation, concatenating the respective watermark tensor and the upscaled feature tensor generated by the preceding decoding operation to form a respective concatenated tensor, and performing a respective convolution operation on the respective concatenated tensor to generate the respective perturbation tensor, the respective convolution operation being configured by a set of machine-learned respective convolution operation parameters; and generating the final perturbation tensor comprises:

combining repeated final representations of the watermark message to form a final watermark tensor having the same dimensions as the upscaled feature tensor generated by the final intermediate decoding operation, concatenating the final watermark tensor and the upscaled feature tensor generated by the final intermediate decoding operation to form a final concatenated tensor, and performing a final convolution operation on the final concatenated tensor to generate the final perturbation tensor, the final convolution operation being configured by a set of machine-learned final convolution operation parameters.

15. The system of claim 14 wherein the first latent feature tensor, the upscaled feature tensors, and the watermarked image are each represented as a respective matrix, each respective matrix having respective width, height and channel dimension sizes:

wherein when generating the first perturbation tensor, combining the repeated first representations of the watermark message to form the first watermark tensor comprises generating a first noise block representation of the watermark message by mapping the watermark message to a noise block that has a same channel dimension size as the first latent feature tensor and smaller width and height dimension sizes than the first latent feature tensor, the repeated first representations each being a repetition of the first noise block representation;

wherein, for each intermediate decoding operation, when generating the respective perturbation tensor, combining the repeated respective representations of the watermark message to form the respective watermark tensor comprises generating a respective noise block representation of the watermark message by mapping the watermark message to a noise block that has a same channel dimension size as, and smaller width and height dimension sizes than, the upscaled feature tensor generated by the preceding decoding operation, the repeated respective representations each being a repetition of the respective noise block representation; and wherein when generating the final perturbation tensor, combining the repeated final representations of the watermark message to form the first watermark tensor comprises generating a final noise block representation of the watermark message by mapping the watermark message to a noise block that has a same channel dimension size, and smaller width and height dimension sizes than, the upscaled feature tensor generated by the final intermediate decoding operation.

16. The system of claim 11 further comprising:

generating the first latent feature tensor by applying a latent diffusion process in respect of an input prompt that includes at least one of a text prompt and an input image.

17. The system of claim 11 wherein a first latent code is generated by a latent encoder model in respect of an input prompt that includes an input image, and a latent diffusion process is applied to the first latent code to obtain the first latent feature tensor.

18. The system of claim 17 wherein the set of decoding operations are performed by a watermark embedding decoder model, wherein the latent encoder model, the latent diffusion process and the watermark embedding decoder model collectively form a latent diffusion model configured to perform a task selected from a task group including: image super-resolution; inpainting; text-to-image generation; image manipulation; and unconditional generation.

19. The system of claim 11 wherein the set of decoding operations is caused to be performed by a trained watermark embedding decoder model, the method further comprising obtaining the trained watermark embedding decoder model by:

receiving first model code and a set of pretrained upscaling parameters that collectively define a pretrained encoder model for causing a set of decoding operations that each include a respective upscaling function that are each configured by a respective subset of the pretrained upscaling parameters;

amending the first model code to define a further encoder model that includes, for each decoding operation, a respective watermark embedding feature tensor generating function that is configured by a respective subset of watermark embedding parameters; and learning the respective subsets of watermark embedding parameters to enable the further encoder model to cause generation of watermarked images that are perceptually similar to images that are caused to be generated by the pretrained encoder model in respect of an input set of training latent feature tensors, the trained watermark embedding decoder model being collectively defined by the amended the first model code, the set of pretrained upscaling parameters, and the learned respective subsets of watermark embedding parameters.

20. A non-transitory computer readable medium storing machine-executable instructions which, when executed by the one or more processors, cause the one or more processors to perform a method comprising:

performing a set of decoding operations to obtain a watermarked image corresponding to a first latent feature tensor, wherein one or more of the decoding operations in the set of decoding operations comprises:

generating a respective watermark embedding feature tensor that includes one or more representations of the watermark message embedded into an upscaled feature tensor generated based on the first latent feature tensor by a preceding decoding operation of the set of decoding operations, and upscaling the respective watermark embedding feature tensor to generate a further upscaled feature tensor; and outputting the watermarked image based on the further upscaled feature tensor.

* * * * *